United States Patent
Stackpole

(10) Patent No.: US 8,108,414 B2
(45) Date of Patent: Jan. 31, 2012

(54) DYNAMIC LOCATION-BASED SOCIAL NETWORKING

(76) Inventor: David Stackpole, Charlottesville, VA (US)

( * ) Notice: Subject to any disclaimer, the term of this patent is extended or adjusted under 35 U.S.C. 154(b) by 459 days.

(21) Appl. No.: 11/998,107

(22) Filed: Nov. 28, 2007

(65) Prior Publication Data
US 2008/0140650 A1    Jun. 12, 2008

Related U.S. Application Data

(60) Provisional application No. 60/861,653, filed on Nov. 29, 2006, provisional application No. 60/873,934, filed on Dec. 8, 2006.

(51) Int. Cl.
*G06F 17/30* (2006.01)
(52) U.S. Cl. .......... 707/758; 707/784
(58) Field of Classification Search ........ 707/758, 707/784
See application file for complete search history.

(56) References Cited

U.S. PATENT DOCUMENTS

| | | | |
|---|---|---|---|
| 6,301,609 B1 * | 10/2001 | Aravamudan et al. | 709/207 |
| 7,280,975 B1 * | 10/2007 | Donner | 705/10 |
| 2002/0023010 A1 * | 2/2002 | Rittmaster et al. | 705/26 |
| 2002/0160339 A1 * | 10/2002 | King et al. | 434/106 |
| 2003/0007464 A1 | 1/2003 | Balani | |
| 2003/0100315 A1 * | 5/2003 | Rankin | 455/456 |
| 2005/0021750 A1 * | 1/2005 | Abrams | 709/225 |
| 2006/0047825 A1 * | 3/2006 | Steenstra et al. | 709/229 |
| 2006/0085419 A1 | 4/2006 | Rosen | |
| 2006/0089876 A1 * | 4/2006 | Boys | 705/14 |
| 2006/0136411 A1 * | 6/2006 | Meyerzon et al. | 707/5 |
| 2006/0234631 A1 * | 10/2006 | Dieguez | 455/41.2 |
| 2006/0242581 A1 * | 10/2006 | Manion et al. | 715/733 |
| 2008/0133716 A1 * | 6/2008 | Rao et al. | 709/220 |

OTHER PUBLICATIONS

Love (http://www.love-calculator.org/—published on Jan. 24, 2005), pp. 1-5.*

* cited by examiner

*Primary Examiner* — Son T Hoang
(74) *Attorney, Agent, or Firm* — Ash Tankha; Lipton, Weinberger & Husick

(57) ABSTRACT

A method and system for establishing a location based social networking is provided. A client application is provided on a communications device of a user seeking to establish the location based social network. The user creates a personal profile and a preference profile using the client application. The preference profile refers to characteristics the user seeks in potential members of the location based social network. The user transfers the personal and preference profiles to the social networking server which registers a location and range selected by the user. The social networking server identifies potential members within the registered location and range by matching the personal profile of each of the potential members with the preference and personal profiles of the user. The social networking server provides communications link between the user and the identified potential members upon mutual confirmation between the user and the identified potential members.

34 Claims, 11 Drawing Sheets

| Subject (click) | Where | When | Add c□act info□ |
|---|---|---|---|
| Latinos, Let's meet | X-Lounge | 8/27/07 | Yes     No |

```
Latinos!
Meet us at Me Voy! This Friday, 8/27. Sign up here so we know
you'll be there.
http://reachrocket.com/LatExPUit0/
```

DYNAMIC LOCATION-BASED SOCIAL NETWORKING

CROSS REFERENCE TO RELATED APPLICATIONS

This application claims the benefit of provisional patent application No. U.S. 60/861,653 titled "System for Dynamic Social Networking Using a Communications Device", filed Nov. 29, 2006 in the United States Patent and Trademark Office (U.S. PTO), and also the benefit of provisional application No. U.S. 60/873,934 titled "Method for Dynamic Social Networking Based on Location Data" filed Dec. 8, 2006 in the U.S. PTO.

BACKGROUND

This invention, in general, relates to social networking and more specifically relates to location based dynamic social networking.

Social networking services allow users to create and join social groups with common interests and activities. Most of the social networking services are web based, where users form virtual communities make friends, and look for other users with common interests. Social networking websites allow users to create personal profiles, upload pictures, post messages, etc.

Typically, a subscriber creates a general profile on a social networking website. The general profile created by the subscriber may be accessed and viewed by other subscribers of the website. Although, the subscriber may join multiple virtual communities, the same general profile is associated with each of the user's virtual communities. The single general profile does not allow the subscriber to project specific profiles focused on the social context or the interest of a social community. Moreover, in order to attract multiple subscribers to view the general profile, the subscriber may have to include a large amount of personal information in the general profile.

Even if a comprehensive personal profile of the subscriber is made accessible to other subscribers, the other subscribers may not be able to assess the true personality of the subscriber. Web based social networking services indeed enable geographically remote users to establish contacts with each other. However, web based social networking may not provide a satisfactory social interaction platform, and do not take into account factors determining the social compatibility among potential contacts or friends.

Hence, there is a need for a method and system for location based dynamic social networking. The system disclosed herein integrates the existing features of web based social networking and enable existing social networks to be tailored to enhance communications in different social contexts and locations.

SUMMARY OF THE INVENTION

Disclosed herein is a method and system for establishing a social network defined by geographic location and range, herein referred to as a location based social network. A client application is provided on a communications device of a user seeking to establish a location based social network. The user creates a personal profile and a preference profile using the client application. The preference profile refers to the characteristics the user seeks in potential members of the location based social network. The user transfers the personal profile and the preference profile to the social networking server using the client application. The social networking server registers a location and range selected by the user for the location based social network. The personal profile and the preference profile may also be stored on the communications device using the client application. The social networking server or the client application may determine the location and range by extracting information from the personal profile of the user. The social networking server may also determine the location and range by periodic feeds to the social networking server from the communications device of the user. The communications device may employ Global Positioning System (GPS) to generate the information regarding location and range to be fed to the social networking server.

The social networking server identifies potential members within the registered location and range by matching the personal profile of each of the potential members with the preference profile and/or the personal profile of the user, and/or from the profiles created by the friends or other relations of the user. The social networking server may notify the user about the identified potential members through the communications device of the user. The social networking server may notify each of the identified potential members of the location based social network about the interest of the user seeking to establish the location based social network. The social networking server provides a communications link between the user and the identified potential members of the location based social network upon mutual confirmation between the user and the identified potential members.

The method and system disclosed herein enables dynamic social networking based on location preferences, member profile preferences, etc. of the user. The user may register a new location or select an existing location of social interest such as a city, campus, night club, etc., to create a location based social network or to be part of an existing location based social network. The method and system disclosed herein also allows the user to select a preferred geographic location in order to build a more personalized location based social network on the preferred geographic location. The user may select the range of the location based social network based on the selected location and may expand the range of the location based social network beyond the selected range. The user may change the selections when desired in order for the user to carry out timely in-person meetings with the members of the location based social network.

The user may create one or more functions after registering with the social networking server. A function is an input or automated query defined by the user from the communications device that calls a response from the social networking server or from an application residing on another communications device. For example, the user may use a function to determine the range for the localized location based social network of the user, or as a query to the social networking server to find the best places to go for an evening based on the favorite venues of the user along with other determining criteria. The users may create and use the functions, single or combined, to search for one or more locations and other location based social networks with the most interesting or greatest number of friends and potential contacts. The user uses the functions to access and process data relating to a variety of social categories. The user may combine a series of search criteria to fine tune the searches, for example, by selecting context-specific preference profiles or selecting specific social groups. In response to a search, the user may receive ranked personal profiles of new contacts or potential members within the range of the registered location based social network.

The user may create and activate a variety of personal and preference profiles including social and professional profiles to emphasize and de-emphasize characteristics presented to and sought in potential contacts or members according to different social contexts.

The user dynamically creates personal and preference profiles based on the social context and the location. The user may provide limited information in each personal profile, optionally requiring only surface information suitable for a particular social context and location. The ability to create several personal profiles specific to social contexts keeps the user from creating in-depth personal profiles, thus saving time and effort of the user, avoiding the risk of exposing personal information, and allowing the user to meet the context of the user's surroundings. For example, the user may supercede the normal "dating preference profile", indicating or implying user's preference for a long term relationship, to create a preference profile for an evening romance contrary to the dating profile of the user.

The user has the option to initiate social contact with each of the potential members after physically meeting the potential members. The user may initially hide the contact information from the potential members. When the social networking server determines and notifies the user about the identified potential members, the user may physically meet the identified potential members since the communication link is localized. The user may thus ensure the true appearance of the potential members before establishing a social contact via the communications device or before allowing membership to the location based social network.

The user may also create and maintain a variety of affinity groups such as groups for friends, family, work friends, football team, sorority sisters, etc. The user may use the functions represented by user recognizable codes associated with the affinity groups, in part to access the affinity groups. For example, the user may "connect with friends", "connect with new contacts", "connect with sorority sisters", "connect with soccer fans in and around the location based social network", etc. using the user recognizable codes and functions. The user may map profiles to functions or other selections to fine tune searches.

The user may identify locations or "hot spots" where friends or new contacts providing the greatest social value are gathered. Social value may be determined by factors comprising the total concentration of existing and potential members fitting the preference profile created by the user, the likelihood of profile matches in a location, the estimate of the user's degree of interest based on each potential member's personal profile within a location, and on the characteristics of the venue. By combining a number of these determining factors, the user may ensure better search results. For example, the user may weigh social value not only based on the concentration of compatible members but also on the level of compatibility. The user may find a location with greater social value where there are fewer compatible potential members, generally, but the level of compatibility of the potential members is collectively higher.

BRIEF DESCRIPTION OF THE DRAWINGS

The foregoing summary, as well as the following detailed description of the embodiments, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
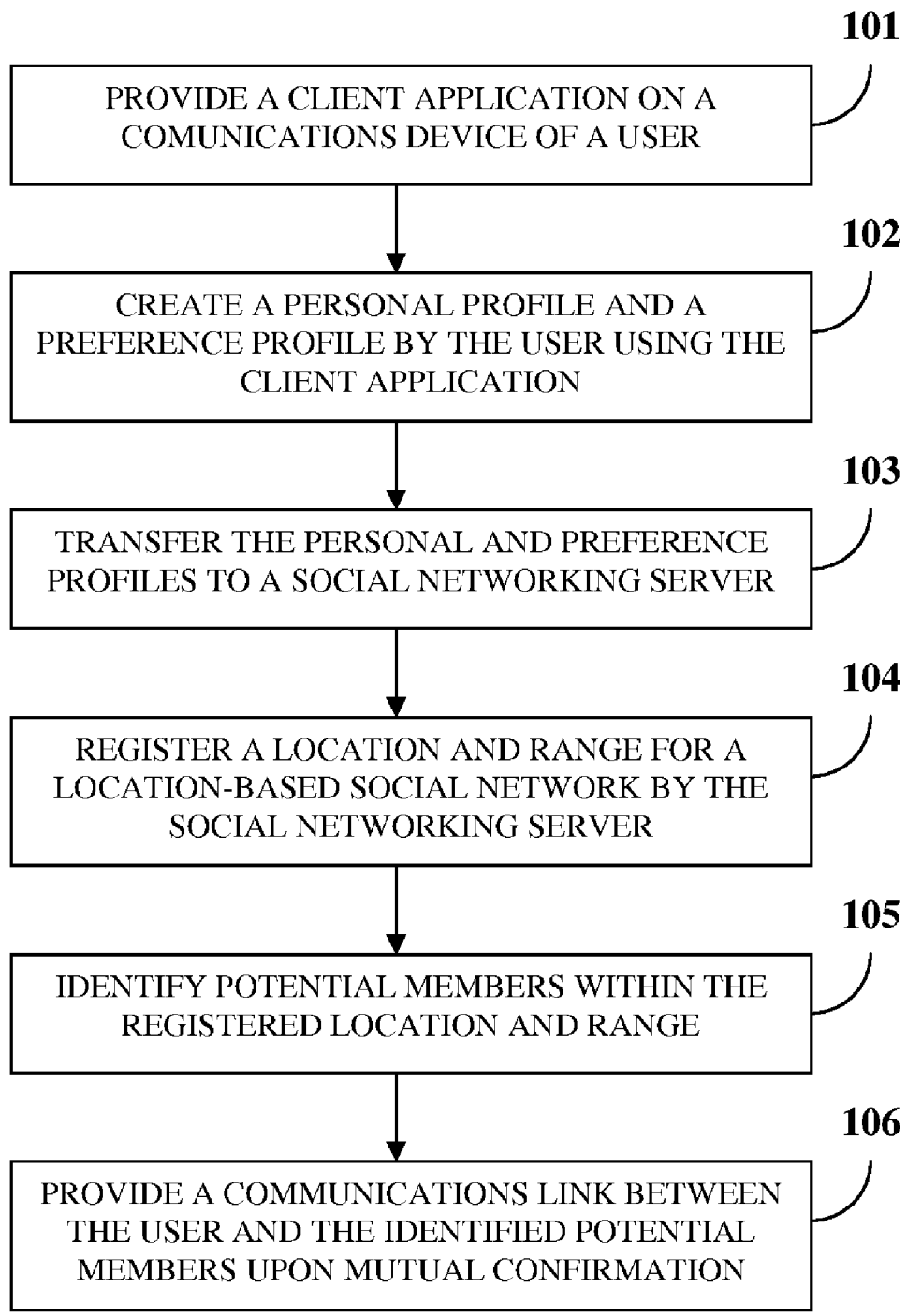
FIG. 1 illustrates a method of establishing a location based social network.

FIG. 1 illustrates a method of establishing a location based social network. A client application 203 is provided 101 on a communications device 202a or 202b of a user seeking to establish a location based social network. The user creates 102 a personal profile and a preference profile using the client application 203. The user may also import the personal profile and the preference profile by choosing one of a plurality of personal and preference profiles stored at the social networking server 201. The preference profile refers to the characteristics the user seeks in potential members of the location based social network. The user transfers 103 the personal profile and the preference profile to the social networking server 201 using the client application 203. The social networking server 201 registers 104 a location and range selected by the user for the location based social network. The personal profile and the preference profile may also be stored on the communications device 202a or 202b using the client application 203. The social networking server 201 or the client application 203 may determine the location and range by extracting information from the personal profile of the user. Alternatively, the user may send the information on the location and range to the social networking server 201 in terms of either the name of the location or the coordinates of the location.

Figure 8A:
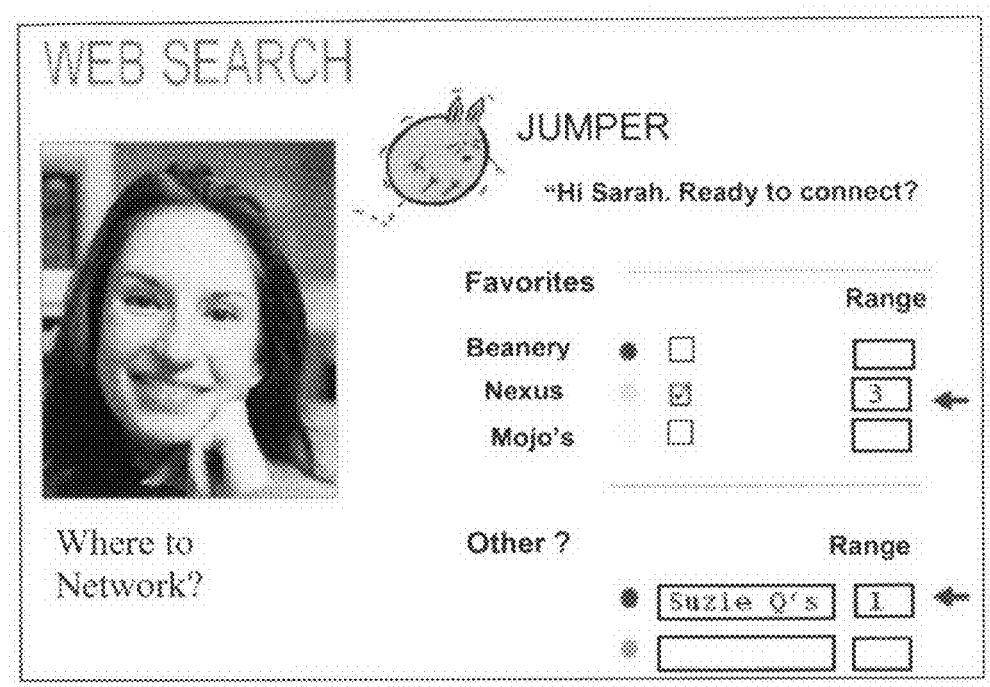
FIGS. 8A-8B exemplarily illustrate the graphical user interface for social networking using the "hot spots" feature.
Figure 8B:
Figure 8C:
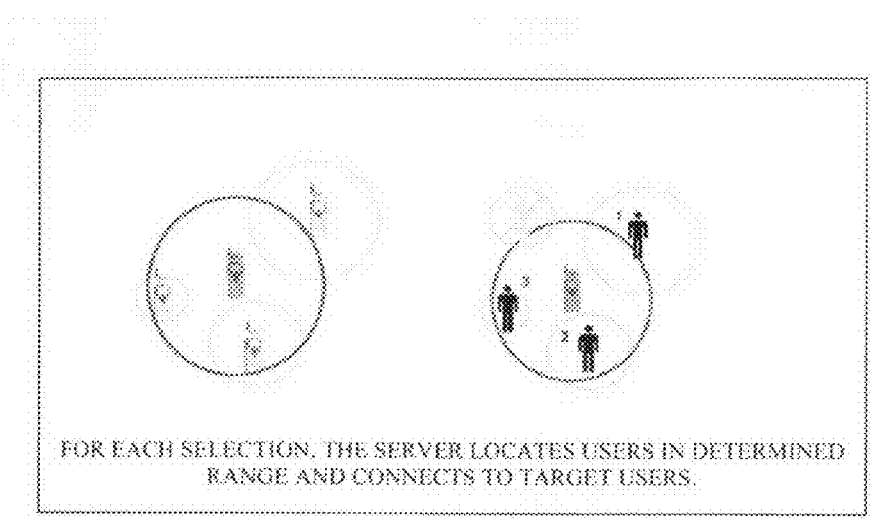
FIG. 8C exemplarily illustrates the step of identifying target users by determining range overlaps of user created location based social networks.
Figure 8D:
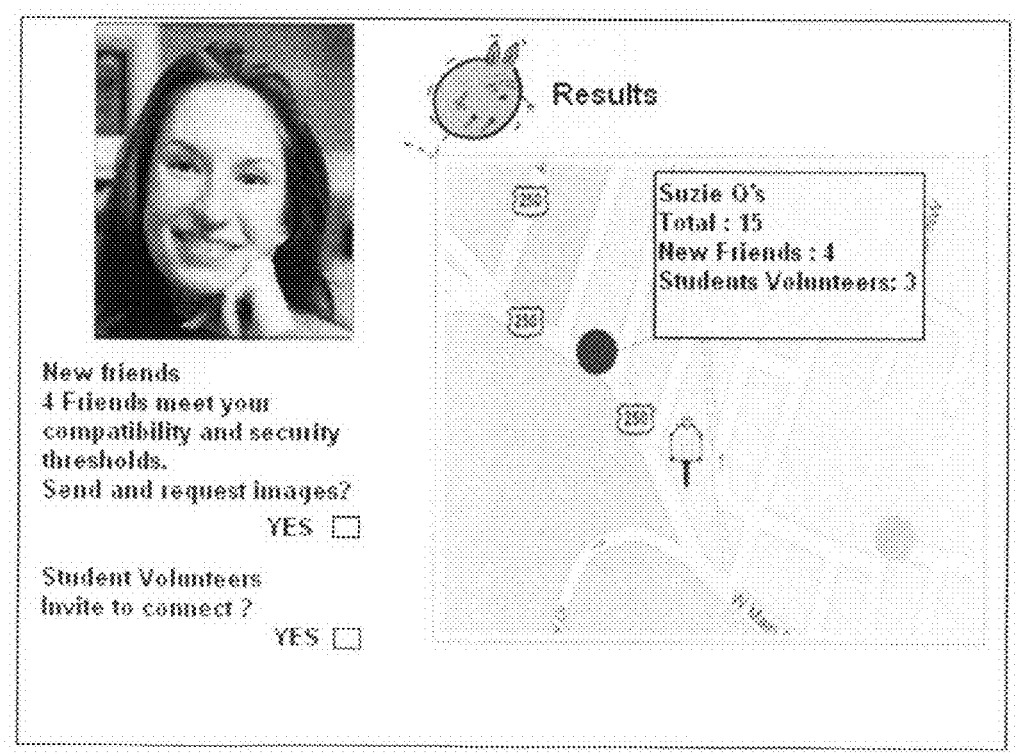
FIG. 8D exemplarily illustrates the graphical user interface for the "hot spots" feature.

The social networking server 201 identifies 105 potential members within the registered location and range by matching the personal profile of each of the potential members with the preference profile and the personal profile of the user. The personal profile of the user may also be created or supplemented with profile information by social contacts of the user such as friends of the user. The profile created by the user may be augmented through input by friends and relations. Another user or a potential member seeking a compatible user may weight the importance of inputs to the user's profile from friends and relations when determining a compatible profile threshold. The potential members are identified based on overlaps found between the registered location and range of the user and the registered location and range of the potential members. As illustrated in FIG. 8D, the user may also register multiple virtual locations. Potential members may be then identified as "virtual potential members", i.e., potential members outside the registered range of the user or "actual potential members", i.e., potential members within the registered range of the user. Networking in virtual proximity with "virtual potential members" allows users to check in on activities surrounding specific venues, singularly or collectively, from a single location. The social networking server 201 may then notify the user about the identified potential members through the communications device 202a or 202b of the user. The social networking server 201 may also notify each of the identified potential members about the interest of the user seeking to establish the location based social network. The social networking server 201 provides 106 a communications link between the user and the identified potential members upon mutual confirmation between the user and the identified potential members. Thus, a location based social network is confirmed and registered with the social networking server 201, converting identified potential members to members of the user's location based social network upon mutual acceptance. The location based social network may be established based on the preference profile of the user and/or relationship criteria of the user. The relationship criteria define the type of relationship sought by the user with potential members such as friend, family, club based relationship, etc.

Figure 3:
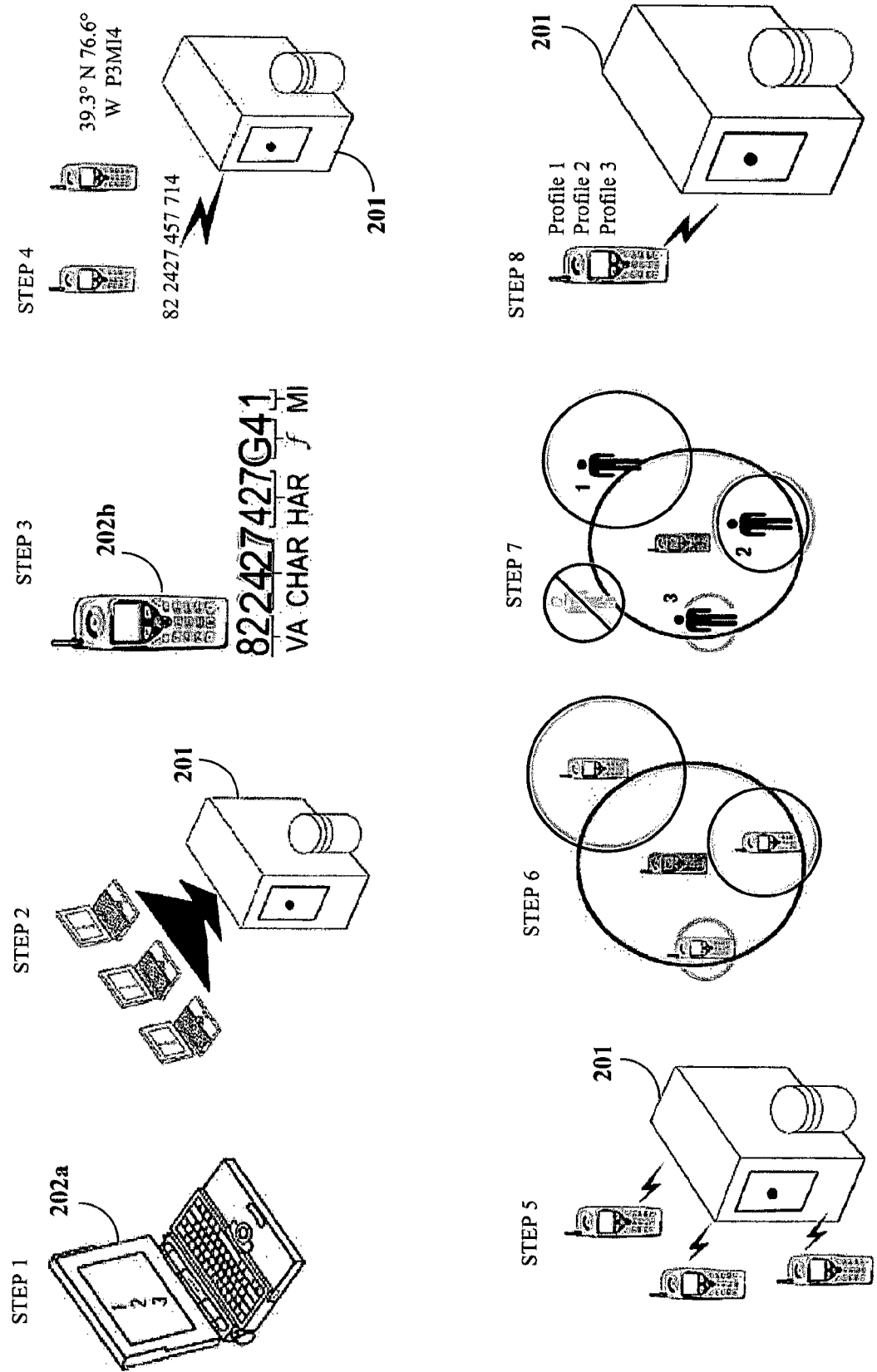
FIG. 3 exemplarily illustrates the steps involved in creating a location based social network.

The user may access the social networking server 201 via any mobile or stationary communications device having connectivity to the social networking server 201 such as a cell phone 202b, a laptop computer 202a, etc. FIG. 3 exemplarily illustrates the steps involved in creating a location based social network. When the user connects to the social networking server 201 using a communications device 202a or 202b, the personal profile, the preference profile, and other user data are entered by the user, or automatically transmitted by the communications device 202a or 202b, for example, to establish a location and range for the location based social network (step 1 and step 2). The user may alternatively enter a function designated to access and activate the preference profile and the personal profile. For example, the user may access a function to activate preference profile 1 by entering the alphanumeric code "PP1". Data may be entered into the social networking server 201 in many ways including, but not restricted to, a menu, a voice, or an alphanumeric entry. For example, an alphanumeric code is entered to determine the state "82" (VA), the city "2427" (CHAR, for Charlottesville), the venue "427" (first letters of the venue name), a user recognizable code for a function associated with the location based social network "G4", and the desired range of the location based social network in miles "1" or some other measure of distance (step 3). The previous codes may convey to the social networking server that the user is at an indicated venue in Charlottesville, Va. and would like to establish a 1 mile radius around the venue to set up a localized location based social network. Default settings in an alphanumeric entry may also apply, making parts of the entry not necessary. Alternatively, the device may send the GPS coordinates of the location, the address of the location, or information in other forms to determine the location. The social networking server 201 registers the user, the location, optional functions associated with the location based social network, and the range of the location based social network (step 4). FIGS. 8A and 8B illustrate menu based data entry, where the user accesses a GUI menu via a web browser or through a rich application on the communications device 202a or 202b.

Other users around the location based social network of the seeking user may, simultaneously or successively, register their locations and ranges with the social networking server 201 (step 5). The social networking server 201 then uses the user data from the registered users and calculates the distances and determines range overlaps between the registered users. The social networking server 201 then creates an incipient network among the registered users with overlapping range (step 6). The social networking server 201 then matches the profiles of the registered users within the incipient network to identify social matches. The social matches are conveyed through the communications device 202a or 202b to each of the registered users, potentially by rank order of user interest (step 7). The matching users may then accept or decline a query for continued contact possibly after sharing their personal profiles (step 8). Upon mutual acceptance, a real-time communications link is provided between the matching users, thus confirming members of the user's location based social network and registering the location based social network.

The user may similarly register multiple preferred locations to build the location based social network based on one or more preference profiles. The social networking server 201 allows the user to create and join affinity groups through a menu-driven graphical user interface (GUI) provided on the communications device 202a or 202b of the user. Each of the affinity groups may include members of a user specific social category.

The user may register a location where the user intends to be prior to arrival at the location. Members who are expected to share a localized location based social network may be introduced to each other prior to arrival and establishing the location based localized social network. For example, the user may decide to go to a venue at a particular time and enter a function to find profiles, images, or other information on persons intending to visit the venue at or around the same time, thus helping the user make a decision on whether to go to a certain venue. For example, a virtual member of a location based social network may access limited profile information about members at a specific location and members within the virtual user's localized location based social network prior to visiting the location.

The user may also query mutual friends of a common friend to pool guesses on the common friend's present or future location. The user and the queried friends may stay anonymous and must be recognized by the social networking server 201 as mutual friends. The common friend being sought must also agree to such a search.

Figure 2:
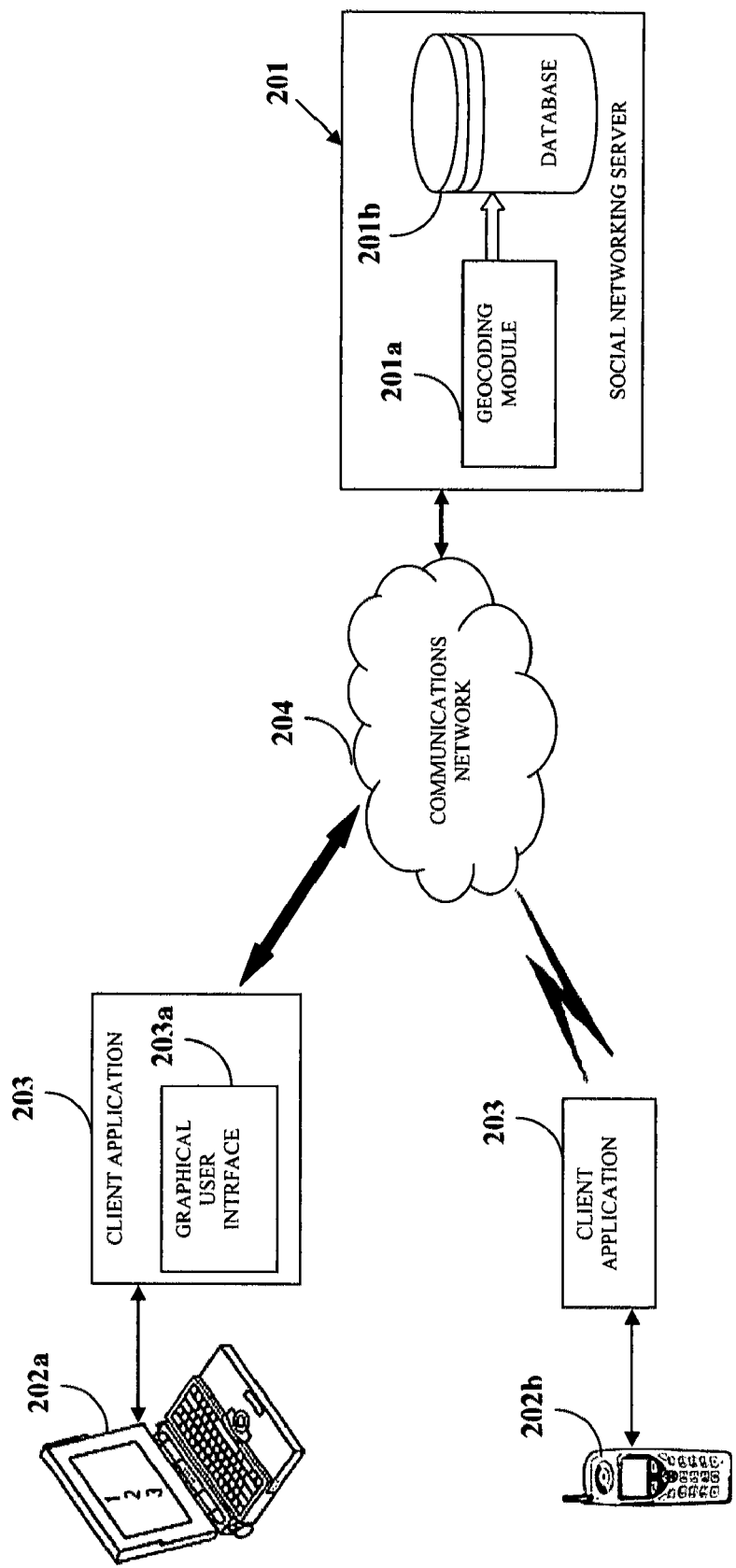
FIG. 2 illustrates a system for establishing a location based social network.

FIG. 2 illustrates a system for establishing a location based social network. The client application 203 provides a graphical user interface (GUI) 203a for creating and entering the personal profile and the preference profile into the social networking server 201. The client application 203 also transfers the personal profile and the preference profile to the social networking server 201. The social networking server 201 comprises a geocoding module 201a and a database 201b. The geocoding module 201a is used to register a location and range of a potential location based social network for the user. The geocoding module may establish the location and range for the user in terms of geographical coordinates. The database 201b comprises a user registry used for identifying potential members within the location and range selected by the user. The user registry may be used to match the personal profile of each of the potential members against the preference profile of the user. A communications network 204 is used to establish real time communications between the user, the potential members, and the social networking server 201.

The GUI 203a enables the user to create or join one or more affinity groups. The GUI 203a is used to search the locations of members of the affinity groups using the functions and the user recognizable codes associated with the affinity groups. When the user registers data requiring a function, an alphanumeric code is designated to the function. For example, a universal element "g" in the alphanumeric code may specify a function associated with "group". An element "4" in an alphanumeric code may identify a specific affinity group such as a fraternity. An alternate to the alphanumeric codes is to use a GUI in which, for example, the user may select alphabetic entries such as G:PO for group "Phi Omega," or plainly select the words "Phi Omega".

In an embodiment, the user may search for potential members based on the preference profile specified by the user. In another embodiment, the user may search for potential members based on common topics of interest between the user and potential members. The GUI 203a may also be used to search for a target user by providing visual data and descriptive data of the target user. The user may access a drop down menu from the GUI 203a and may select a specific preference profile and social group to establish contact with. The user may have multiple personal and preference profiles including professional, social, context specific, time and location specific profiles. For example, if the user is visiting a new city and is at a professional event, the user may use the communications device 202a or 202b to change a social preference profile into a professional preference profile using the GUI menu, or alphanumeric codes associated with the functions, etc. The user may enter simple user recognizable alphanumeric codes assigned by the social networking server 201 to use the functions. For example, the user may enter the alphanumeric code "P:IND:4". The social networking server 201 recognizes "P" as the code for professional profile, "IND" as a preference inside or outside the profile, but known to the user and the social networking server 201, indicating "Indian" ethnicity, and "4" indicating the range by some measurable unit, such as kilometers or miles. The social networking server 201 reads the user's entry as "Find a professional" compatible with profile of the user indicating Indian ethnicity and within a four mile radius. In another embodiment, the range may be replaced by a location or venue name, or combined with the location or venue name. For example, the user may replace the range or radius with the recognizable code "STA1" referring to a location Starbucks on 14.sup.th street in the user's town. Alphanumeric codes for functions may be replaced by a GUI composed of drop down menus or other forms for selection.

The social networking server determines the location and the range of the user from information generated by the global positioning system on the communications device 202a or 202b, by scanning the personal profiles, and by inputs of the user. The geocoding module 201a extracts location information from the personal profile of the user and determines the geographic coordinates. The geocoding module 201a may also receive location information in terms of geographical coordinates directly from the communications device 202a or 202b of the user. As an alternative, based on the name of a common venue or district entered by several registered users, a location based social network may be established within the venue. Establishing a location based social network by using the name of the registered location removes the need for geocoding.

Figure 4:
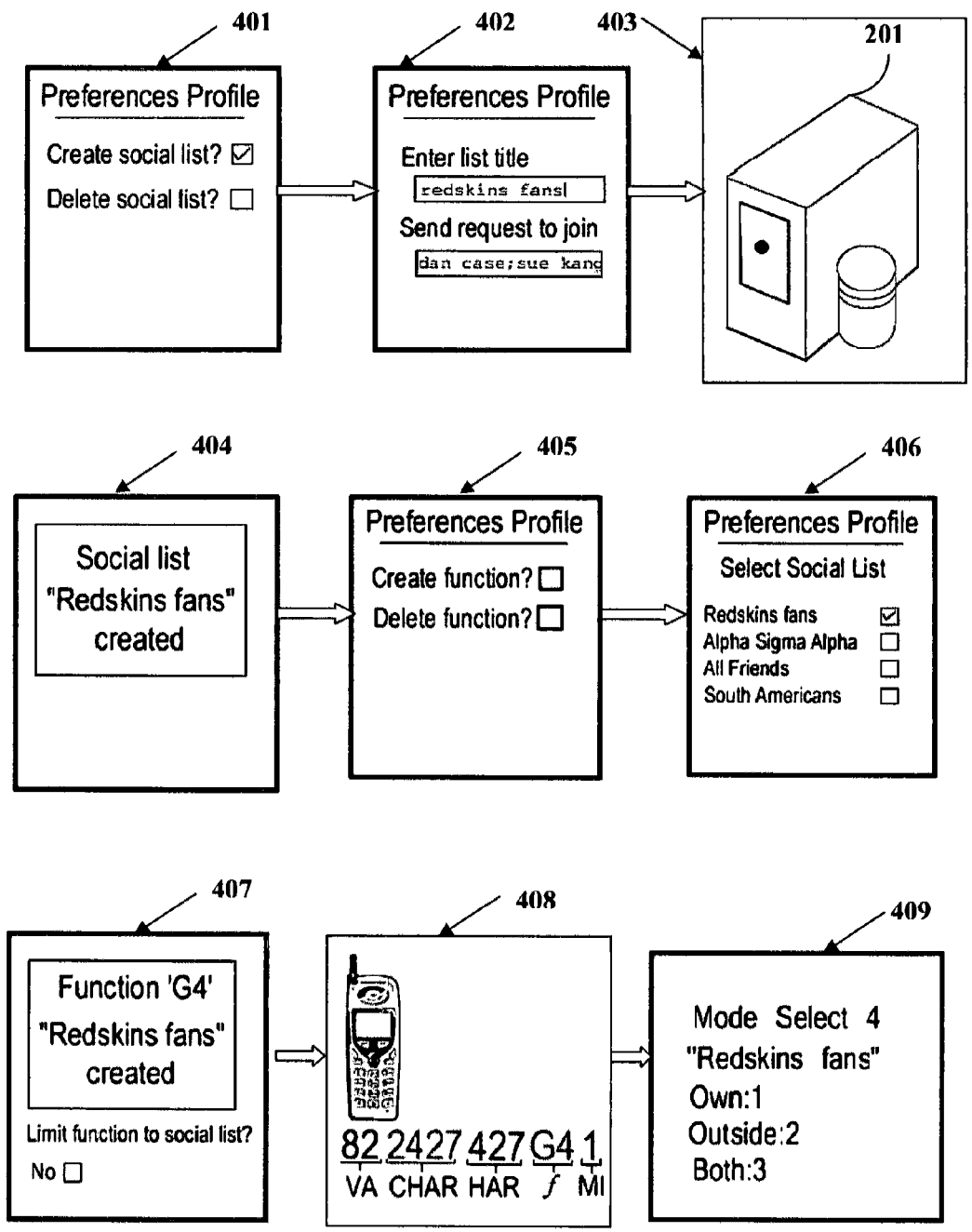
FIG. 4 exemplarily illustrates the menu-driven graphical user interface for creating affinity groups FIG. 5 exemplarily illustrates the "hot spots" feature of the social networking server.

FIG. 4 exemplarily illustrates a menu-driven graphical user interface for creating affinity groups. The user may create a title for the affinity group and then send a request 401 and 402 to other registered users to join the affinity group. The social networking server 201 compiles 403 the list of users selected to join the affinity group. The social networking server 201 may then send a confirmation message 404 to the user that the affinity group has been successfully created. Any affinity group may be eligible for deletion by a designated moderator. After creating the affinity group, the creator or moderator may be prompted to request a function for the group 405. The function is used to prompt an action pertaining to a social category. The categories may include, but are not restricted to, affinity groups, new contacts, events, etc. The functions are activated by using the user recognizable codes or by a graphical user interface on the social networking server or on the communications device 202a or 202b. Actions pertaining to the social category may be prompted via the GUI 203a over the communications device 202a or 202b without using functions, thereby removing alphanumeric entry as a command feature.

The user may then select and assign a category to the function. In an embodiment, functions may be preset by the social networking server 201 for certain categories. The preset function may take a number of forms recognizable by the user. For example, the forms of the user recognizable codes for the functions may include the topic title designated to the affinity group when creating the affinity group, or one or more numbers that denote the affinity group and the members of the affinity group. The affinity group is herein referred to as a social list, although this kind of grouping may equally apply to organizations using location based social networking for business or other purposes. In the above example, the user may request 406 a function for a social list and may assign 407 a function code "G4" to the social list, designating the social list "Group 4". The user may then enter the function code "G4" representing a search function, and be directed to the locations of the members of the social list "Group 4". For example, an alphanumeric code is entered 408 to determine the state "82", the city "2427", the venue "427", a user recognizable code for the function associated with the social list "G4", and the desired range of the location based social network in miles "1". The social networking server may respond 409 with search results indicating the number of members, non-members, etc. identified under the social list.

The user may combine a series of inputs to combine affinity group searches. The user may also combine personal and preference profiles with other search inputs. For example, function code "G" may designate an affinity group and function code "1" may refer to a social list of the affinity group such as "sorority friends". Another function code "6" may refer to another social list such as a "math club". Both the social lists may be combined in a search through the function "G1&G6". If the user prefers one group or another, the function "G1*G6" may be used. An example search may include the function "P1:G4*G3, wherein the personal and relative preference profiles "P1" is combined with codes "G4" and "G3". "G4" may designate a specific social list and "G3" may designate potential contacts matching the personal and preference profiles "P1" of the user. The search "P1:G4*G3" then reads "activate personal and preference profile "P1", and seek locations of members of social list "G4" or best locations of potential contacts meeting the preference data found in preference profile "P1". The social networking server 201 may queue the location results according to quantitative and/or qualitative measures. For example, a measure may be the degree of concentration of social list members within a network combined with each member's level of compatibility as an existing friend or a stranger to the user. In case the user performs a search using the GUI, the user may combine a series of inputs in the search criteria by selecting and combining graphical user interface menu entries. Registered users outside a social list and sharing interest in an affinity groups' topic may search and access limited information about the affinity group, provided the affinity group is not limited to the members of the affinity group. The limited information may enable the registered users to contact the moderator for joining the affinity group and may include specific topic headings made public by the affinity group.

The user may map profiles to functions or other selections to fine tune searches. For example, the user may enter the alphanumeric code "G4" for group number 4. The social networking server 201 then connects the user to the members of group 4. In another embodiment, the user may enter the alphanumeric code "PP" for indicating professional profile. The user is connected to members compatible with the professional profile of the user. In yet another embodiment, the user may create a hidden preference profile to find specific types of personalities and traits outside the standard profile of the user. For example, the user may use a particular function to activate a profile specifying the preference to meet registered users interested in potential long-term relationships, and use another function to activate a preference profile for only a romantic evening, contrary to the former profile.

The user may map profiles to functions using GUI selections or alphanumeric inputs. For example, profiles may be designated by user recognizable codes P1, P3 or PS, PP, representing professional profile, or social profile respectively. The profile entries may then be followed by a grammatical icon such as a semicolon. The grammatical icon separates the profile from the function command, and function command from the range command. For example, consider the alphanumeric code PP;GVIR;4. In this example, the user or the social networking server has designated the code "GVIR" to engage an affinity group set up by the user for University of Virginia Alumni, where G indicates a group. The user recognizable code "PP" indicates a professional profile preference of the user. The numeral "4" in the alphanumeric code designates a radius of four miles around the user's central location. The user may use "GVIR" to find the members of the Virginia Alumni group set up by the user. The user may also use "GVIR" to find similar groups set up by other registered users who allow connectivity with users outside their groups. For example, the user may visit a new town, enter PP;GVIR;4 through the communications device 202a or 202b and find other Virginia alumni in the town, provided the social networking server recognizes the user's affinity group and the affinity group is of the same type. The user's affinity group should allow access to users outside the group, i.e. allow access to other Virginia Alumni not registered with the particular localized affinity group. The user's affinity group may open access to users outside the group who fit the open access parameters set by the group moderator. For example, the open access parameters may specify that any university of Virginia alumnus may network locally with the user's affinity group.

Figure 5:
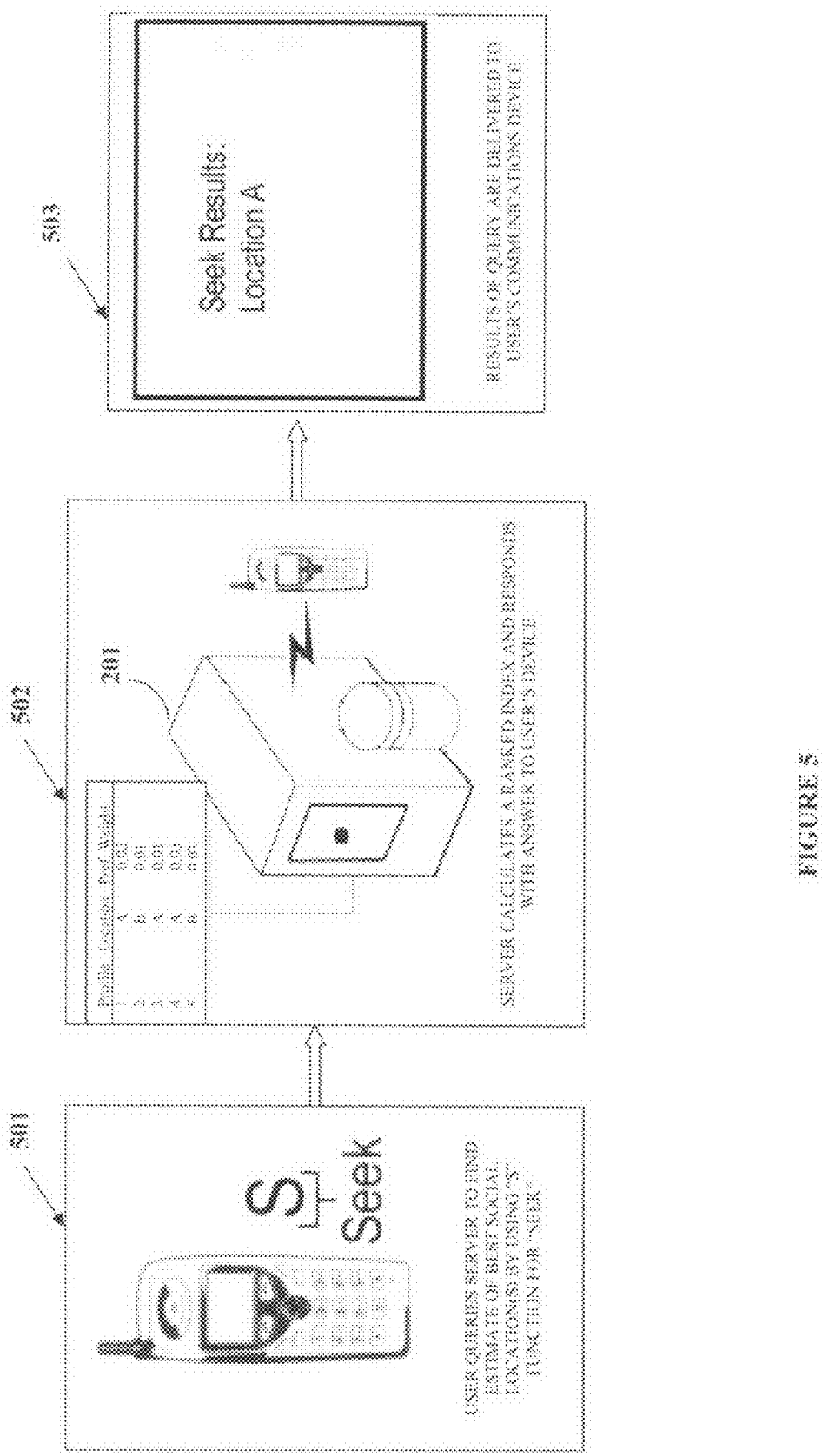

FIG. 5 exemplarily illustrates the "hot spots" feature of the social networking server 201. The user may find 501 "hot spots" or locations estimated by the social networking server 201 to provide the largest, most likely potential matches or the highest quality of potential matches of registered users, known or unknown to the user, in accordance to the preferences sought by the user. The estimates may take into account a combination of the largest and highest quality of potential matches, or a combination of other determinants. The preferences taken into consideration may include one or more preference characteristics entered in the preference profile of the user. The preferences may also refer to topics of interest shared by the user and the potential members being sought. For example, the user may seek contacts or members interested in classical music by entering "classical music" as a keyword in the search query. In response, the social networking server 201 identifies locations estimated to be the best for finding contacts or members interested in the topic of classical music. The "hot spots" feature may be enhanced by combining more than one keyword to provide more specialized searches. For example, a business organization seeking candidates from MIT's computer science program at a job fair may enter "MIT+computer science" to further specialize the search. The search results may be accessed by the user in a variety of modes, including automated response, or a query by the user. For example, the search results may be obtained through a drop down menu, or through automated text messages by the social networking server 201.

The estimates on "hot spots" may be based on descriptive measures such as central tendency, statistical approaches, or a ranking method. Specifically, FIG. 5 illustrates a "seek" mode used by the user to search 501 for locations estimated to include the greatest potential profile matches. "Hot spots" search results are ranked, queued, and delivered 502 and 503 by the social networking server to the communications device 202a or 202b of the user for rendering on the GUI.

Figure 6:
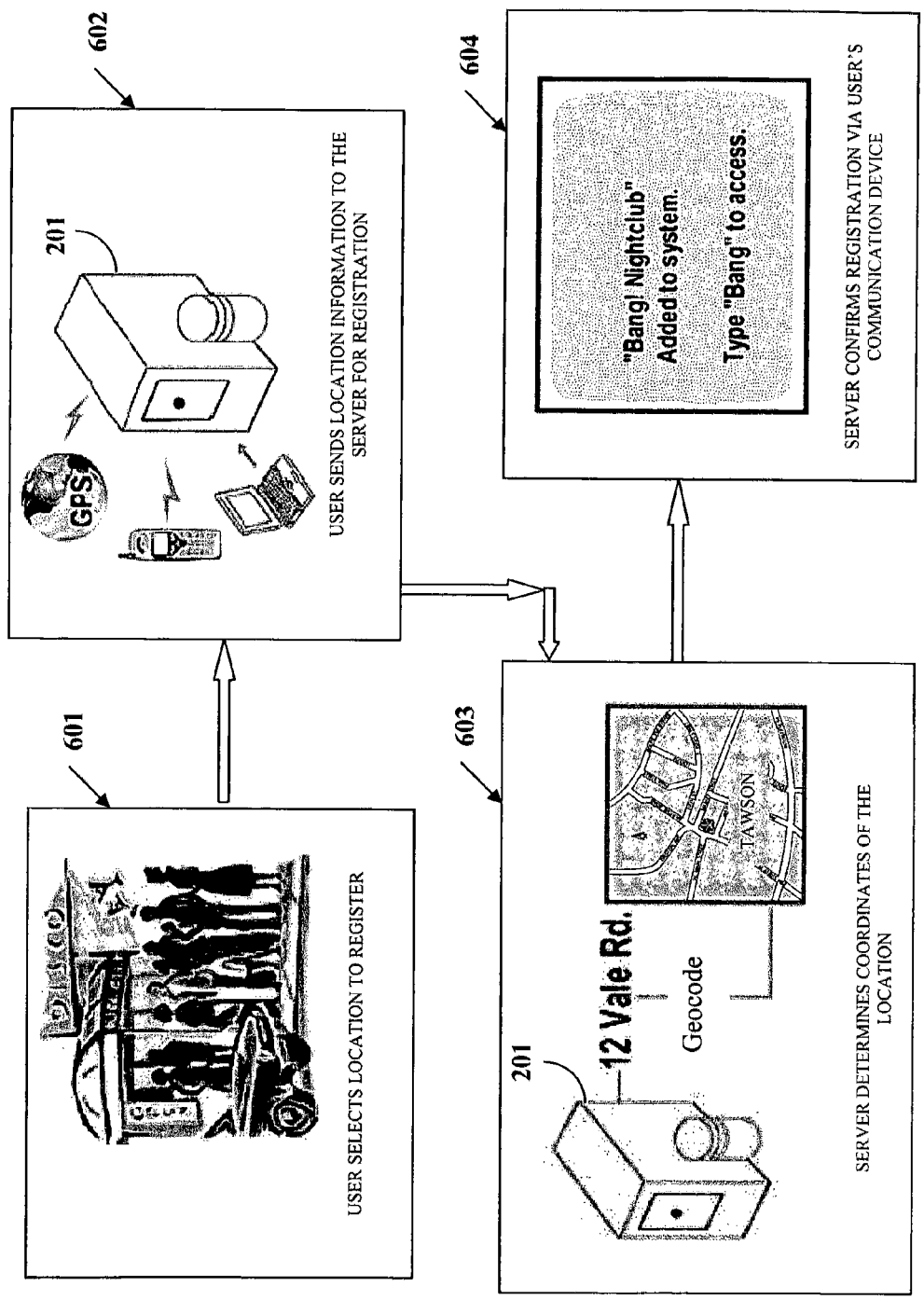
FIG. 6 exemplarily illustrates registration of a location with the social networking server by the user.

FIG. 6 exemplarily illustrates registration 601 of a location with the social networking server 201 by the user. The user may personalize the location based social network by registering favorite or preferred locations for building the location based social network. In an embodiment, the user may directly send the longitudinal and latitudinal coordinates of the location directly to the social networking server 201, using a communications device 202a or 202b enabled with global positioning system (GPS) or other techniques. In another embodiment, the user may enter 602 the name and/or address of the location through the communications device 202a or 202b. The social networking server 201 may employ geocoding 603 or process the geographic data such as the venue name or address for determining the coordinates of the location, or employ other methods to determine the location. After the social networking server 201 adds the location to the database 201b, a message confirming registration is sent 604 to the user. The social networking server 201 supplies a location identifier code to the user to register the user's presence at the particular location. Any assigned code may comprise one or more properties such as alphabetic, numeric, alphanumeric, visual, acoustic, or other forms serving as a distinctive representative marker for the registered location. The method and the code allowing access to the registered location for building the location based social network is then standardized and made accessible to other members of the location based social network via automation or a user query to the social networking server 201 using the coordinates, name or address of the location, or other forms of location identification.

The user may also register a location by choosing from a list of favorite locations for ease-of-use. The user may indicate a choice of location nominally or alphanumerically. In an embodiment, the GPS on the communications device 202a or 202b may automatically register the location without input from the user. The database 201b may store a unique identifier for each registered location. The unique identifier may be used to sort data relevant to a registered location.

Figure 7A:
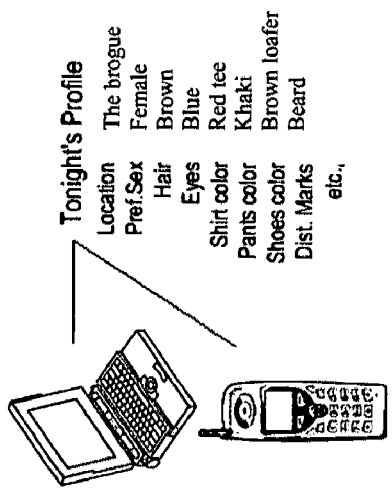
FIGS. 7A-7C exemplarily illustrate a method of location based social networking with a target user.
Figure 7B:
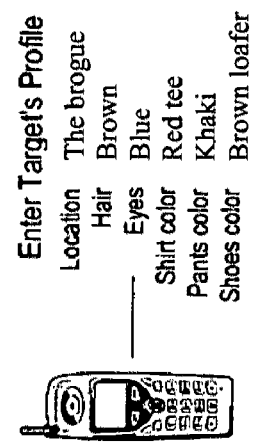
Figure 7B:
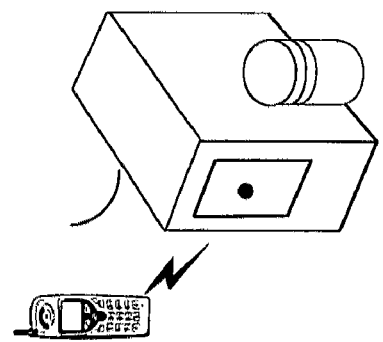
Figure 7C:
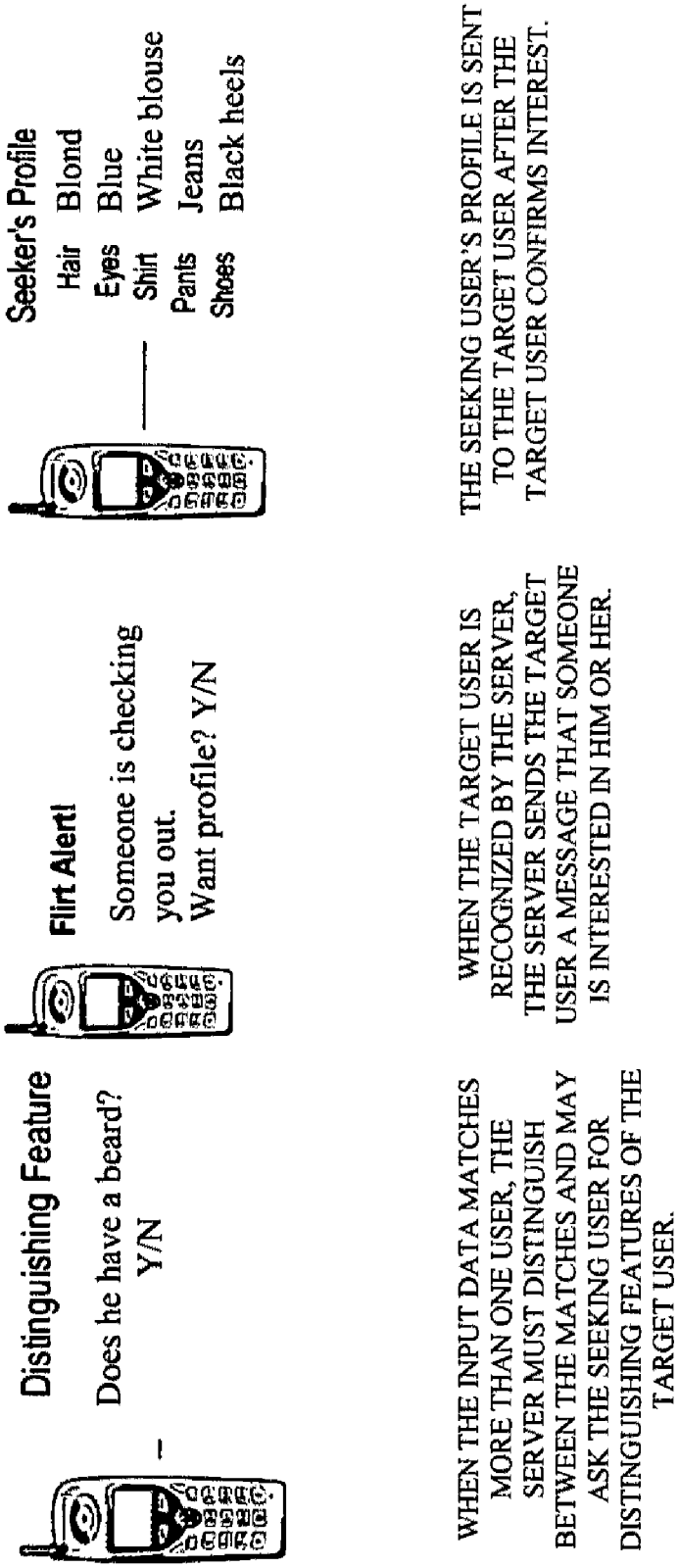

FIGS. 7A-7C exemplarily illustrate a method of location based social networking with a target user. The user may optionally create a personal profile based on limited personal characteristics such as physical appearance. The personal profile may include details on location, for example, the name of venue or area of the location of the user such as a nightclub, physical characteristics such as height, hair and eye color, etc., clothing characteristics such as color of shirt, pants, and shoes, or distinguishing images or features of one or more characteristics. The user may instantly create such a limited personal and preference profile by using the stationary or mobile communications device 202a or 202b as illustrated in FIG. 7A. The user seeking the target user establishes contact with the social networking server 201 via the mobile or stationary communications device 202a or 202b to determine whether the target user of interest such as person seen or described is a member of the network or a user registered with the social networking server 201. The social networking server 201 queries the user to input visual or descriptive data about the target user. The user seeking the target user may enter and transmit the visual or descriptive data about the target user as illustrated in FIG. 7B.

The social networking server 201 receives the visual or descriptive data sent by the user and attempts to recognize the target user based on the visual or descriptive data. The social networking server 201 matches the target user for contact based on the visual or descriptive data and may result in identifying more than one match. As illustrated in FIG. 7C, the social networking server 201 may query the seeking user to confirm a match found on the target user. For example, the social networking server 201 may obtain confirmation by sending an image of the target user, when available, to the seeking user. Alternatively, the social networking server 201 may query the seeking user to confirm a distinguishing mark or characteristic about the target user. The target user may have entered the distinguishing mark or characteristic in the personal profile of the target user previously, or the social networking server 201 may have provided a unique identifier to the target user, for example a color-coded name tag. Alternately, the seeking user may identify the target user though discreet pinpointing, wherein the location is determined by using the locations of other registered users to pinpoint the target user by triangulation. The user may also estimate the distance and angular degrees from a common point such as due north to estimate the target user's location. The social networking server 201 may then use GPS or another coordinate system to best guess the identity of the target user. Once the social networking server 201 obtains confirmation from the seeking user, the target user is alerted that the seeking user is interested in communicating with the target user. The social networking server 201 then inquires whether the target user wishes to view the image and personal profile of the seeking user. Upon confirmation by the target user, the social networking server 201 sends the personal profile of the seeking user to the target user. The social networking server 201 again queries the target user to determine whether the target user wishes to establish a communications link with the seeking user.

The social networking server 201 automatically receives GPS coordinates feeds from the communications device 202a or 202b. In an embodiment, when compatible registered users are in proximity, the social networking server 201 automatically notifies each user of the other user's presence. The social networking server 201 may then send cues to the registered users to identify each other. For example, the social networking server 201 may send distinctive features or a series of non-distinctive features of the user. The registered users may also access each other's profiles. The distinctive features of the registered user may be associated with the stationary or mobile communications device of the registered user, as well as other accoutrements such as jewelry, etc.

Using a preset range, the social networking server 201 may automatically respond to the seeking user when a user compatible to the seeking user enters that preset range. For example, the seeking user may set a default range of 30 feet around the seeking user. Subsequently, when a target user who is a friend, compatible stranger, or other profile type designated by the seeking user is within the default range, the social networking server 201 may notify the seeking user of the target user's presence.

In another embodiment, the seeking user may request the social networking server 201 to "scan" the personal profile of the target user, and receive compatibility information. The seeking user may scan the personal profile of the target user and receive an immediate compatibility ranking based on the scan. The compatibility ranking may apply to the seeking user or to a friend or contact of the seeking user. For example, the social networking server 201 may scan the personal profiles of the target user and the friends of the seeking user to make a compatibility match. Optimal compatibility ranking may be communicated to the seeking user through the communications device 202a or 202b of the seeking user. For example, the social networking server may send compatibility ranking messages to the seeking user such as "Your match: 2 stars out of 5, Your friend, Mike: 4 stars out of 5. Would you like to let Mike know?"

The user is enabled to search for locations of "greatest social value" to the user. The search feature is composed of types of groups generated by the social networking server 201 and the user. A group is defined as a collection of persons recognized by the social networking server 201. A user may register with the social networking server 201 certain groups under a social category defined or selected by the same user. For example, the user may define a new social category "Soccer fans" or may select an existing social category such as "sorority members," and other groups under the social category.

The user has the ability to select one or more groups as search criteria. The user may also perform a search with keywords of interest. In an embodiment, the user selects a relationship type from one or more social categories. The relationship type is sought by the user in members, potential contacts, or other registered users. The social categories are created, in part, by the social networking server 201 and in part by the user. For example, the social categories generated by the social networking server 201 include professionals, dates, new friends, existing friends, etc. Social categories generated by the user may include social groups or friends segmented based on specific contexts such as "Phi Omega sorority", "Virginia Thespian club", old friends, family close friends, distant friends, etc. According to the selections made by the user in a search, the social networking server 201 looks for location(s) providing the greatest "social value score". The score may be defined by an index derived from:

a) Overall compatibility of other registered users within a location with the user performing the search, based on the collective categories of relationship types selected by the user, or based on overall registered users at a location when specific selections have not been made, or based on a combination thereof.

b.) The profile of the location, based on present and historical data including, but not restricted to, the type of food and beverages, entertainment offered, and the collective and historical collective compatibility of target users frequenting the venue or location. A location is herein defined as an identified parcel of space containing or not containing one or more buildings.

c.) A filtered selection of locations familiar to the user, wherein the user selects names of the locations. The social networking server 201 returns a social score based on the collective social value of each user-selected location.

In an embodiment, the user may apply weights to compatible and non-compatible characteristics to obtain a social score. The social networking server 201 may quantify collective non-compatible characteristics by assigning negative values to the non-compatible characteristics. The social networking server 201 may quantify the compatible characteristics by assigning positive values to the compatible characteristics. The values of compatible and non-compatible characteristics may be considered in determining the overall score of a location. For example, the user may rank both the venue profiles and the collective occupant profiles. The user may apply weights to certain characteristics in a location profile to suggest the importance of those characteristics. The user may also apply weights to characteristics in the preference profile and characteristics assumed to be found in the profiles of potential contacts or other registered users to determine a overall "social value score". The weights may be applied to characteristics according to the sequence of selection of the characteristics by the user, i.e. the first selection of a profile characteristic is weighted more heavily than the second selection, the second more heavily than the third, and so on. In an embodiment, the user may drag and drop the selected characteristics in the preference profile and the venues in a rank order to quantifiably prioritize the selections.

The user may segment social contacts of the user by categorical importance. The user may then assign a factor to each category that determines a degree of importance of the category. In an example, the user may drag and drop friends in different categories such as "Best friends", "Close friends", and "Regular Friends". Subsequently the user can assign a factor of importance among these categories such that "best friends" are 2 times more preferred than "close friends", and "close friends" are preferred 3 times as much as "regular friends". The weights may then be used to develop an algorithm wherein the information on the number of friends and the type of friends within a location may be used to determine greatest social value for the user.

In another embodiment, the user performing the search may filter locations by selecting one or more of the locations by a unique identifier. The user may select one or more locations based on user familiarity and preference to the locations. With this selection as input, the social networking server 201 determines social scores based on compatibility of the collectively derived profiles of registered users within the preferred locations. For example, the user may enter favorite venues such as "A-lounge," "Nitelite," and "The Zone," etc. In this example, the social networking server 201 may calculate greatest social score only among the above three favorite venues or locations.

In another embodiment, weighted keyword functionality is provided, where the user can enter one or more keywords as search criteria. The user has the ability to weight the keyword against the social value determinants described above, namely:

a.) An overall compatibility found within a location and based on collective categories of relationship types; and b.) a compatibility profile of the location.

The user assigns weights to the above three criteria, namely the keywords of interest, the overall compatibility of users within a location, and the venue compatibility. With the keyword as a weighted factor, the social networking server 201 returns locations providing the greatest social value score. The social value score is used by the social networking server 201 to suggest locations of highest social value to the user. The user may be prompted to add the keyword of interest as an amendment to the preference or personal profile, either permanently or temporarily, after the user enters the keyword of interest.

In another embodiment, the user can search beforehand for locations where friends or compatible users would gather. More important to finding out the location where friends or compatible users are at present, the user may want to find out the location where friends or compatible users would gather. Finding out locations beforehand may provide the opportunity for the user to plan where to go and prepare accordingly. Based on the earlier inputs from other registered users on their intended locations and arrival times, the social networking server 201 may forecast the locations with greatest social value to the user. The social networking server 201 may also determine the optimal time for the user to arrive at the location based on the highest forecasted social score. The arrival time may be determined based on the anticipated arrival times input by the other registered users to the social networking server 201.

Although the personal profile of a user outwardly projects the personality traits of a user, friends and social contacts of the user may contribute to the accurate evaluation of the personality of the user. The method and system provides a general compatibility ranking where the user controls the degree of input by friends and social contacts in the overall compatibility ranking when seeking a friend or social contact. In this respect, the personal profile of a registered user not only includes inputs of the registered user creating the personal profile, but also includes inputs by friends and social contacts of the registered user, adding value to the personal profile.

FIGS. 8A-8B exemplarily illustrate the graphical user interface for social networking using the "hot spots" feature. The user may select or initially create one or more "hot spots" or locations and then designate a range around those "hot spots", resulting in a series of social networks where the user may constitute a virtual presence. The user may gather information and participate in the social networks of numerous preferred locations without necessarily being within the actual proximity of a "hot spot" or location based social network hub within the designated range of a location based social network. FIG. 8C exemplarily illustrates the step of identifying and connecting to target users by determining range overlaps of user created location based social networks. Based on the favorite locations, ranges, categories and groups selected by the user as illustrated in the GUI of FIGS. 8A-8B, the social networking server 201 determines range overlaps and connects to target users or socially compatible users. FIG. 8D exemplarily illustrates the graphical user interface for social networking using the "hot spots" feature. Specifically, FIG. 8D illustrates the GUI for delivering the results to the user. The user may send requests to access images and profiles of new contacts. The user may send invites to acquainted members and registered users to establish communications with the user.

An "invitation post" or "community post" feature allows the user to broadcast meeting or event invitations and announcements to the members of the location based social network and/or to specific registered users. The feature may also determine the optimal place and time to hold the meeting or event based on inputs by the registered users and their collective preferences based on time, date, environment, distance, etc. The social networking server 201 has the ability to communicate with the personal calendar of the user and to update the calendar when the user signs up for an event or meeting.

Figures 9A, 9B, 9C:
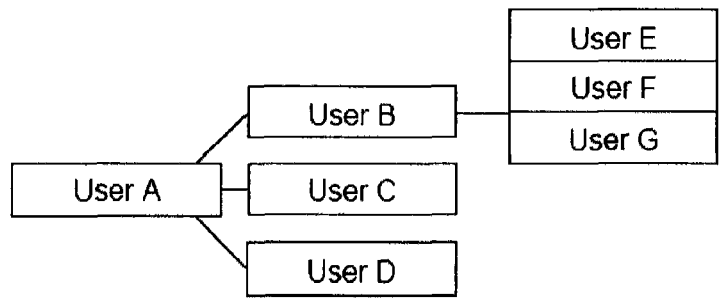
FIG. 9A exemplarily illustrates a meeting announcement posted on a website.
FIG. 9B exemplarily illustrates an advertisement post on a website by local venues.
FIG. 9C exemplarily illustrates the enhancement of security in social networking by a user-verification feature.

Any user registered with the social networking server 201 may broadcast a meeting invitation over a stationary or mobile communications device, using a website or messaging services, to other registered users identified to be interested in the subject based on filtered preferences of the registered users. The identified users may be notified through e-mail invitations, while other registered users may be notified through a general posting website or other medium. FIG. 9A exemplarily illustrates a meeting announcement posted on a website.

Interested users may sign up, submitting an alternative meeting place and time. The social networking server 201 then pools the alternatives to determine an optimal time and place for the meeting based on the consensus. The optimal time and place determined serves as an alternative and does not override the initial time and place set by a meeting moderator. Local venues may attract users by offering specials for meetings held at their locations and may advertise on the website. FIG. 9B exemplarily illustrates an advertisement post on the website by local venues.

In an embodiment, the social networking server 201 may maintain a smart personal calendar and an address book for the user. The smart calendar may automatically enter the date and time of a meeting when the user accepts a meeting invitation over the invitation posting. The smart calendar notifies the user when the date entry of one event or meeting is in conflict with another date entry. The smart calendar may automatically fill pertinent dates from the profiles of friends or social contacts such as birthday dates for the user of interest, as well as notify the user when those dates are approaching. The smart calendar automatically updates the entries to reflect changes made to the profiles of other relevant users in terms of information pertinent to the calendar or the address book. For example, user B, the friend of user A, had a new child and enters the child's birthday into her smart calendar. The update of user B's smart calendar may automatically be reflected on user A's smart calendar.

In an embodiment, the social networking server 201 enhances social networking by allowing registered users and unregistered users or non-users of the social networking server 201 to sign up for a prescribed period of time corresponding to a date, time, and duration designated by the host of an event or party. Non-users of the social networking server 201 who are invited for such a gated event may sign up and use the features of the social networking server 201 over the duration of the event. A user seeking a target user within the event or party may carry out a "reverse lookup", by relying on visual and verbal cues gleaned from being in the proximity of the target user. The user may dynamically enter visual and verbal cues into the social networking server 201 in order to receive information about the target user. For example, the user may enter clues such as distinctive accoutrements, a combination of physical features, or any singular or collective characteristics useful for the social networking server 201 to identify the target user. The social networking server 201 may then send the profiles and images of the identified target user to the seeking user. Alternatively, the social networking server 201 may send the information about the target user by scanning the profile of the target user and without necessary inputs by the seeking user. The steps involved for social networking in an event or party comprise:

a.) A host user registers for an event or party including time, date, and location. Alternatively, local venues may host an event or party by registering to the social networking server 201.

b.) The host user may send electronic invitations to select members with a request to respond (R.S.V.P), or may open invitation up by group, town, city, etc.

c.) The social networking server 201 sets up communication between all the invitees at the designated date and time and over the duration of the event.

d.) Any user may enter keywords on the appearance of a target user at the event, or may enter other visual and verbal cues. Additionally or alternatively, the user may perform a weighted keyword search for compatibility within the group at the event. In response, the social networking server 201 may send prioritized images of identified target users or matched members to the seeking user with options to establish contact.

e.) The user may access customized games during the event. The user may access and participate in games such as "trivia" pertinent to the event's theme, "wheel of fortune", etc. For participation in the game "wheel of fortune", the social networking server 201 selects the user with complete randomness or partial randomness for connecting to another registered user. The user may engage in "hot topics", where the user communicates with other registered users at the event on topics of greatest interest shared by the other registered users. The user may engage in communication on the "hot topics" over short messaging services (SMS) or other forms of communication. The social networking server 201 may store and forward communication messages between the registered users. A search program in the social networking server 201 identifies keywords from the communication messages to determine topic headings and occurrence frequency of each topic communicated. The user may also request the social networking server 201 to provide a ranked compatibility match among two registered users by entering names of the two registered users into a compatibility ranking engine, after making acquaintance with them at the event. The user may also request the social networking server 201 for a compatibility ranking between the user and a target user at the target user's consent.

In an embodiment, a venue may sponsor an event. In this embodiment, members and non-members may access the location based social network for the designated duration of the event. Non-members may enter a temporary profile, store a temporary image, or provide means to access their communications device.

In an embodiment, the social networking server 201 enhances security for the social networking features using a "user-verification feature". The security is enhanced by having each user recommended by one or more other registered users. The other registered users may in turn be recommended by a different set of registered users. For example, each user may be recommended by three other registered users as illustrated in FIG. 9C. FIG. 9C exemplarily illustrates the enhancement of security in social networking by the user-verification feature.

The social networking server 201 may provide unique entertainment-based features to the user. For example, the user may "blind date" another registered user with friends in common and find out the compatibility ranking between them or two registered users may blind date mutual friends to find out their compatibility ranking. The user may identify a registered user as the most compatible match in terms of profiles or other determinants and may find the locations frequented by the most compatible match. The user may find out and view the hottest discussion topics on the entire service range of the social networking server 201, or within a selected venue or event, or a selected location based social network. The user may engage in games such as "wheel of fortune", where the user agrees to be part of a random call generator. The user is randomly connected to another registered user without any characteristic in common or who shares a level of basic compatibility with the user. The user may also find the most compatible person within a given range by using the GUI or the coded function. The details about the most compatible person such as the name and the image of the person may be withheld, while information such as where the person currently is, if registered with the social networking server 201 at that time, or where the person typically goes may be made visible.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors, or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

Where databases are described, such as the database 201b of the social networking server 201, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel.RTM. processors, Sun.RTM. processors, AMD.RTM. processors, IBM.RTM. processors, etc. that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A computer-implemented method of establishing a location-based social network, wherein the method utilizes at least one computer processor to implement steps of:
providing a client application on a communications device of a user;
creating a personal profile and a preference profile by the user using the client application, wherein the preference profile refers to characteristics sought by the user in potential members of the location-based social network;
transferring the personal profile and the preference profile to a social networking server using the client application by the user;
registering a location for the location-based social network by the social networking server;

registering a range of the location-based social network around the location, wherein the location and the range are selected by the user;

identifying the potential members within the registered location and the registered range, comprising:

calculating distance between the user and the potential members based on the registered location and the registered range of the user, and registered location and registered range of each of the potential members;

determining overlaps found between the registered location and the registered range of the user and, registered locations and registered ranges of the potential members;

creating a network among the potential members, wherein the registered range of each of the potential members overlaps the registered range of the user; and matching personal profile of each of the potential members within the created network with the preference profile and the personal profile created by the user;

providing a communications link between the user and one or more of the identified potential members upon mutual confirmation between the user and the one or more of the identified potential members;

determining a social value score of a location based on weighted characteristics of the location, members in the location, weighted importance of relationship between the user and the members, and weighted keywords of interest to the user, wherein the social value score is used by the social networking server to suggest locations of highest social value to the user;

whereby the communications link establishes the location-based social network based on the preference profile of the user.

2. The computer-implemented method of claim 1, wherein the user imports the personal profile and the preference profile by choosing one of a plurality of personal and preference profiles of the user stored at the social networking server.

3. The computer-implemented method of claim 1, wherein the step of establishing the location-based social network is based on one of the preference profiles of the user and relationship criteria of the user, wherein the relationship criteria defines the type of relationship sought by the user with potential members.

4. The computer-implemented method of claim 1, wherein the potential members are identified as one of actual potential members and virtual potential members, wherein the virtual potential members are not in physical proximity of the user.

5. The computer-implemented method of claim 4, wherein the virtual potential members of the location-based social network access limited information from the personal profiles and preference profiles of members at a location and members within virtual localized location-based social network of the virtual potential members prior to visiting the location.

6. The computer-implemented method of claim 1, wherein the social networking server recommends an optimal place and time to hold a social event based on collective preferences of invitees to the social event, wherein the collective preferences comprise time, date, environment, and distance preferences of the invitees.

7. The computer-implemented method of claim 6, wherein the communications link is provided between the user, members, and non-members of the location-based social network for a designated period of the social event.

8. The computer-implemented method of claim 1, wherein the social networking server allows the user to create and join affinity groups through a menu-driven graphical user interface provided on the communications device of the user.

9. The computer-implemented method of claim 8, wherein the user searches for one of the affinity groups and the potential members in one or more social categories of interest to the user.

10. The computer-implemented method of claim 8, wherein the user creates and associates functions to each of the affinity groups, wherein the functions are used to prompt actions pertaining to each of the affinity groups, wherein the functions are activated by using one of user recognizable codes, graphical user interface, and a combination thereof.

11. The computer-implemented method of claim 10, wherein the user associates the functions with events, new and existing social contacts, and profiles.

12. The computer-implemented method of claim 10, wherein the functions are activated using the user recognizable codes or the graphical user interface, further wherein the functions facilitate the search for locations of members of the affinity groups created by the user.

13. The computer-implemented method of claim 12, wherein the user performs the search by one of a step of combining the user recognizable codes associated with the affinity groups and a step of combining graphical user interface entries in a search criteria.

14. The computer-implemented method of claim 12, wherein the user performs the search by combining the user recognizable codes, graphical user interface entries, and the preference profile of the user in a search criteria.

15. The computer-implemented method of claim 1, further comprising a step of performing searches by the user for locations of highest social value of the potential members based on common topics of interest and the preference profile sought by the user.

16. The computer-implemented method of claim 1, wherein the social networking server determines the location and the range of the user from information generated by one of global positioning system on the communications device, scanning of the personal profile, inputs from the user, and any combination thereof.

17. The computer-implemented method of claim 1, wherein the user registers a plurality of preferred locations to build the location-based social network.

18. The computer-implemented method of claim 1, wherein the personal profile and the preference profile comprise physical and non-physical characteristics, clothing characteristics, locations, and distinguishing characteristics of the user and the potential members respectively.

19. The computer-implemented method of claim 1, wherein the user searches for a target user by providing one of visual data and descriptive data of the target user in a search query to the social networking server, wherein the social networking server responds with profiles of the potential members matching the visual data and the descriptive data.

20. The computer-implemented method of claim 19, wherein the user searches for the target user via automated notifications from the social networking server to the user based on proximity of the user to compatible target users.

21. The computer-implemented method of claim 19, wherein the user searches for the target user via one of degree and distance estimation and triangulation from other users within a vicinity to identify the target user.

22. The computer-implemented method of claim 19, wherein the social networking server queries the user to confirm one of the profiles of the potential members as a match to the target user, further wherein the social networking server alerts the target user upon receiving a confirmation from the user.

23. The computer-implemented method of claim 1, further comprising a step of performing a search by the user using search criteria comprising weighted characteristics of the preference profile, weighted keywords of interest to the user, and weighted locations of interest to the user, wherein the user applies weights to the search criteria for finding members of affinity groups and the potential members compatible with the user in a social context.

24. The computer-implemented method of claim 23, wherein the keywords of interest to the user in the search criteria is incorporated in the preference profile of the user.

25. The computer-implemented method of claim 1, wherein the personal profile of the user is augmented using inputs provided by social contacts of the user.

26. The computer-implemented method of claim 1, wherein the social networking server determines optimal matches among the social contacts of the user and between the social contacts and the user, further wherein the social networking server notifies the user of the optimal matches.

27. The computer-implemented method of claim 1, wherein the social networking server stores and forwards communication messages between members of the location-based social network, further wherein the social networking sever identifies keywords from the communication messages to determine topics of the communication messages and frequency of occurrence of each of the topics.

28. The computer-implemented method of claim 1, further comprising a step of segmenting social contacts of the user into categories, wherein the user assigns a factor to each category for determining a degree of importance of the category.

29. The computer-implemented method of claim 1, wherein the user requests a compatibility ranking between social contacts of the user by entering names of the social contacts into the social networking server.

30. The computer-implemented method of claim 1, wherein the user is able to create a temporary profile customized to a particular social context.

31. A computer system for establishing a location-based social network comprising:
  at least one computer processor and one computer memory;
  a client application on a communications device, executed by the at least one computer processor, of a user for one of creating and importing a personal profile and a preference profile and transferring the personal profile and the preference profile to a social networking server;
  the social networking server further comprising:
    a geocoding module for registering a location and range of the location-based social network for the user, wherein the location and the range are selected by the user;
    the social networking server determining locations and ranges of the user and potential members by calculating distance between the user and the potential members based on the registered location and the registered range of the user, and registered location and registered range of each of the potential members;
    the social networking server determining overlaps found between the registered location and the registered range of the user and registered locations and ranges of the potential members;
    the social networking server creating a network among the potential members comprising each of the registered ranges of the potential members overlapping the registered range of the user, wherein the social networking server further comprises:
      a database, stored on the at least one computer processor, comprising user registry, wherein the user registry is used to identify potential members within the location and the range of the user by matching personal profile of each of the potential members with the preference profile and the personal profile created by the user; and
    the social networking server determining a social value score of a location based on weighted characteristics of the location, members in the location, weighted importance of relationship between the user and the members, and weighted keywords of interest to the user, wherein the social value score is used by the social networking server to suggest locations of highest social value to the user;
    a communications network for establishing a communications link between the user, the identified potential members, and the social networking server.

32. The computer system of claim 31, wherein the client application comprises a graphical user interface and enables the user to perform one or more of the steps of:
  creating and joining affinity groups;
  searching locations of members of the affinity groups using user recognizable codes associated with the affinity groups;
  searching for the potential members based on one of preference profiles specified by the user and common topics of interest between the user and the potential members; and
  searching for a target user by providing visual data and descriptive data of the target user.

33. The computer system of claim 31, wherein the geocoding module extracts location information from one of the personal profile of the user and global positioning feeds from the communications device of the user.

34. A computer program product comprising computer executable instructions embodied in a non-transitory computer-readable storage medium, wherein the computer program product comprises:
  a first computer parsable program code for creating a personal profile and a preference profile, wherein the preference profile refers to characteristics sought by a user in potential members of a location-based social network;
  a second computer parsable program code for transferring the personal profile and the preference profile to a social networking server;
  a third computer parsable program code for registering a location and a range of the user for the location-based social network by the social networking server, wherein the location and the range are selected by the user;
  a fourth computer parsable program code for identifying the potential members within the registered location and the registered range, wherein the fourth computer parsable program code further causes a computer to:
    calculate distance between the user and the potential members based on the registered location and the registered range of the user, and registered location and registered range of each of the potential members;
    determine overlaps found between the registered location and the registered range of the user and, registered locations and registered ranges of the potential members;

create a network among the potential members, wherein the registered range of each of the potential members overlaps the registered range of the user; and match personal profile of each of the potential members within the created network with the preference profile and the personal profile created by the user;

determine a social value score of a location based on weighted characteristics of the location, members in the location, weighted importance of relationship between the user and the members, and weighted keywords of interest to the user, wherein the social value score is used by the social networking server to suggest locations of highest social value to the user;

a fifth computer parsable program code for providing a communications link between the user and one or more of the identified potential members upon mutual confirmation between the user and the one or more of the identified potential members.

* * * * *